(12) United States Patent
Negre et al.

(10) Patent No.: US 9,784,058 B2
(45) Date of Patent: Oct. 10, 2017

(54) ANCHORING MECHANISM AND METHOD FOR DOWN-HOLE TOOL

(71) Applicant: Sercel, Carquefou (FR)

(72) Inventors: Jean-Eric Negre, Verriéres le Buisso (FR); Ronan Affre De Saint Rome, Carantec (FR); Thierry De Kimpe, Carquefou (FR)

(73) Assignee: SERCEL, Carquefou (FR)

( * ) Notice: Subject to any disclaimer, the term of this patent is extended or adjusted under 35 U.S.C. 154(b) by 437 days.

(21) Appl. No.: 14/515,055

(22) Filed: Oct. 15, 2014

(65) Prior Publication Data
US 2016/0108689 A1    Apr. 21, 2016

(51) Int. Cl.
| E21B 23/01 | (2006.01) |
| G01V 1/52 | (2006.01) |
| G01V 11/00 | (2006.01) |
| E21B 23/14 | (2006.01) |

(52) U.S. Cl.
CPC ............. *E21B 23/01* (2013.01); *E21B 23/14* (2013.01); *G01V 1/52* (2013.01); *G01V 11/005* (2013.01)

(58) Field of Classification Search
CPC .......... E21B 47/01; E21B 23/01; E21B 23/14; E21B 25/16; G01V 1/52; G01V 11/005
See application file for complete search history.

(56) References Cited

U.S. PATENT DOCUMENTS

| 6,315,075 B1* | 11/2001 | Nakajima | ............... E21B 23/01 166/206 |
| 8,851,193 B1* | 10/2014 | Valerio | ................... E21B 23/01 166/242.2 |
| 2001/0023791 A1 | 9/2001 | Nakajima et al. | |
| 2005/0263280 A1* | 12/2005 | Sellers | ................... E21B 47/09 166/255.1 |
| 2006/0131015 A1* | 6/2006 | Kanayama | ........... G01V 11/005 166/254.2 |
| 2012/0006109 A1 | 1/2012 | Andersen et al. | |

FOREIGN PATENT DOCUMENTS

EP            0 345 112 A1        12/1989

OTHER PUBLICATIONS

European Search Report in corresponding European Application No. EP 15 30 6484 dated Feb. 24, 2016.

* cited by examiner

*Primary Examiner* — Robert E Fuller
*Assistant Examiner* — David Carroll
(74) *Attorney, Agent, or Firm* — Patent Portfolio Builders PLLC

(57) ABSTRACT

Method and down-hole tool for use inside a well, the down-hole tool including a housing; an anchoring arm rotatably attached to the housing and configured to move between an open position and a closed position; a spring block configured to have a central part that moves along a longitudinal axis (X) of the housing which results in the movement of the anchoring arm between the open or closed positions; and an actuating mechanism connected to the central part and configured to move the central part along the longitudinal axis. The spring block is detachably attached to the housing.

17 Claims, 13 Drawing Sheets

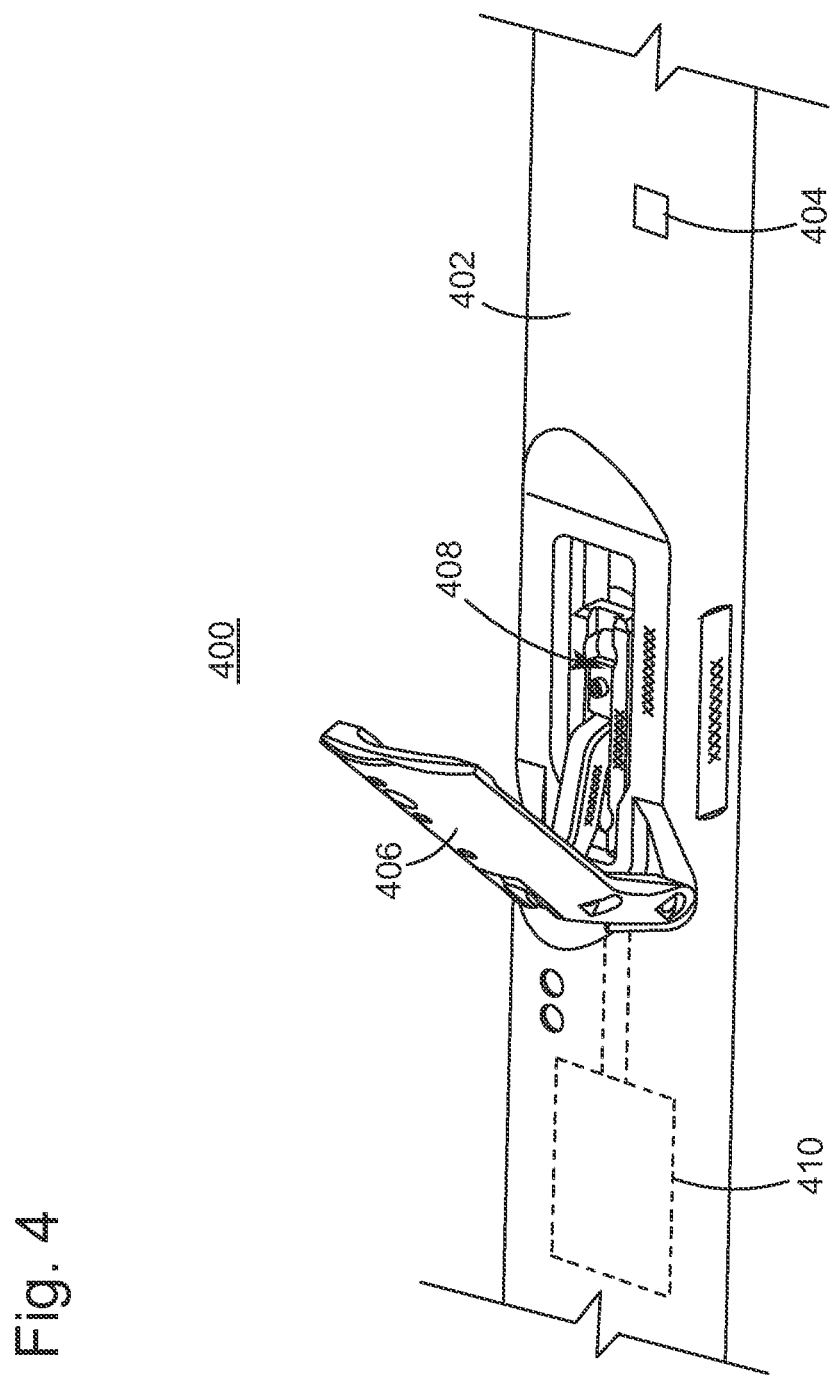

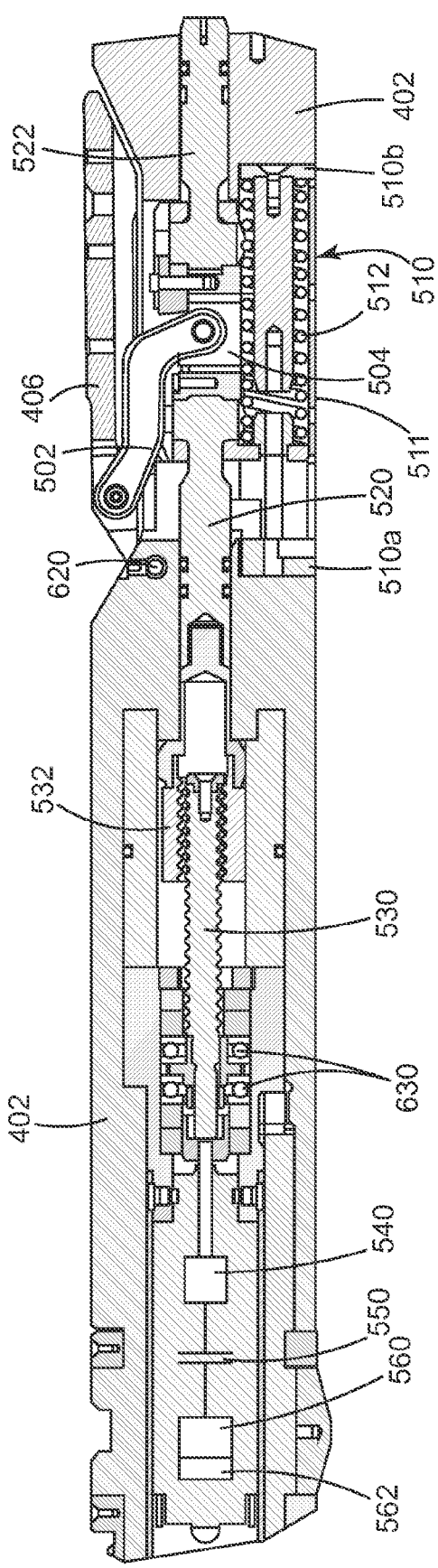

ANCHORING MECHANISM AND METHOD FOR DOWN-HOLE TOOL

BACKGROUND

Technical Field

Embodiments of the subject matter disclosed herein generally relate to an apparatus and method for safely anchoring a down-hole tool inside a well or casing.

Discussion of the Background

A down-hole tool may be a device used to conduct seismic surveys in down-hole environments, such as, for example, inside of wells used for oil and gas extraction. Down-hole tools may contain seismic sensors, for example, geophones, or other type of sensors, for example, a temperature measuring device. In order to function properly, a down-hole tool that has been lowered into a well may need to be anchored in place with the tool pressed up against the wall of the well or casing. Several tools may be connected together, top to bottom, along with other survey equipment, using a cable, and lowered into the well and/or casing.

FIG. 1 depicts an exemplary down-hole tool and FIG. 2 depicts an exemplary diagram of a down-hole tool. Tool 100 may include a main housing 102, upper cable head 104, lower cable head 106, and anchoring arm 108. A logging cable 110 may be connected to the upper cable head 104 at the top and the lower cable head 106 at the bottom of the seismic tool 100. Main housing 102 may be a housing of any suitable shape and made of any suitable material for enclosing any equipment, such as, for example, sensors, motors, and other mechanical, electric, and electronic components. Upper cable head 104 and lower cable head 106 may enclose the tool 100 on the top and bottom ends, respectively, and may be made of a similar material to the main housing 102 or any appropriate material. Anchoring arm 108 allows tool 100, after being lowered into a well, to anchor itself against the wall of the well or casing. Coupling a seismic tool to the well or casing is necessary for quality seismic measurements.

Anchoring arm 108 may be attached to main housing 102 in any suitable manner to allow anchoring arm 108 to switch between closed and open positions. Logging cable 110 may connect tool 100 to other devices, such as, for example, other seismic tools, telemetry devices, or electronic devices that allow tool 100 to transmit data to a computer. For example, tool 100 may be deployed in a string of similar tools, and may be connected to other seismic tools 100 above and below through logging cable 110. Logging cable 110 may be made of any suitable material for supporting the weight of the tools 100 as they are lowered into a well, and may also include cabling for data and power transmission. Tool 100 may receive power and control commands through the logging cable 110.

FIG. 3 depicts an exemplary diagram of an internal view of a tool 100 with a motor. To use anchoring arm 108, tool 100 may include a motor 120 within main housing 102. Motor 120 may be any suitable motor for use within tool 100, such as, for example, an electric motor. Motor 120 may be able to move anchoring arm 108 between closed and open positions, and may be controlled by commands received through logging cable 110. In most traditional down-hole tools, the motor is directly coupled to the anchoring arm. Thus, in case of power failure, it becomes difficult to operate the anchoring arm.

Therefore, a disadvantage of the existing down-hole tools is the lack of anchoring arm's control after the tool is being deployed in the well in the event of a power failure. In addition, when deciding to change a biasing force that acts on the anchoring arm, the process of changing the biasing force is time consuming, laborious and dangerous for the maintenance personnel.

Further, because the downhole tools are used in various wells and applications, the requirements for biasing the arm in or out differs from application to application. In one application, as noted above, when the downhole tools chain is lowered into the well and all the arms are opened and pressured onto the casing, it happens sometimes that a failure prevents from activating the arms back in order to recover the equipment. However, in another application, where the tool chain remains for a long period of time inside the well (e.g., time lapse operation), it is desirable to maintain the tool orientation from day to day. Thus, the arms of the modules in the chain must stay open for days if not months. As is known in the art, opening the arms and maintaining them in the opened position requires electrical energy and the system to be on continuously. This is expensive because of the amount of energy required and/or prone to failure because if the power goes off, the chain might collapse inside the well.

Thus, there is a need for an apparatus and method for a down-hole tool that overcomes the above noted limitations of the existing tools.

SUMMARY

In one embodiment, there is a down-hole tool for use inside a well. The down-hole tool includes a housing, an anchoring arm rotatably attached to the housing and configured to move between an open position and a closed position, a spring block configured to have a central part that moves along a longitudinal axis (X) of the housing which results in the movement of the anchoring arm between the open or closed positions, and an actuating mechanism connected to the central part and configured to move the central part along the longitudinal axis. The spring block is detachably attached to the housing.

In another embodiment, there is a down-hole system for measuring a parameter associated with a well, the down-hole system including a controller located at the surface of the well, at least one down-hole tool, and a connecting cable connecting the controller to the at least one down-hole tool. The first down-hole tool includes a housing, an anchoring arm rotatably attached to the housing and configured to move between an open position and a closed position, a spring block configured to have a central part that moves along a longitudinal axis (X) of the housing and a movement of the central part results in the movement of the anchoring arm between the open or closed positions, and an actuating mechanism connected to the central part and configured to move the central part along the longitudinal axis. The spring block is detachably attached to the housing.

In still another embodiment, there is a method for changing a biasing force for a down-hole tool for use inside a well. The method includes removing an anchoring arm that is rotatably attached to a housing of the tool, detaching a cap from a central part of a spring block, and reversing an orientation of the spring block. A movement of the central part results in the movement of the anchoring arm between open and closed positions.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 depict a down-hole tool with an actuating mechanism;

FIG. 6A shows the actuating mechanism with an anchoring arm closed and FIG. 6B shows the same with the anchoring arm opened;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, a down-hole tool having an anchoring arm is discussed. However, the novel concepts are not limited to such down-hole tool, but they may apply to any device having at least one movable arm.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a down-hole tool is configured to be lowered inside a casing of a well. For performing a function associated with the tool, for example, measuring seismic data, the down-hole tool needs a good coupling with the environment, the casing or the well. The down-hole tool has at least an anchoring arm that is closed while the tool is being lowered into the casing and then it is opened for fixing the tool in position and ensuring a good coupling with the environment. Anchoring arm may be activated, as discussed next, by a motor. The motor may connect through a clutch to a gear box that actuates a shaft that ultimately actuates the anchoring arm. A brake mechanism may be connected to the motor for maintaining a given state of the anchoring arm, e.g., closed or open.

Figure 5:
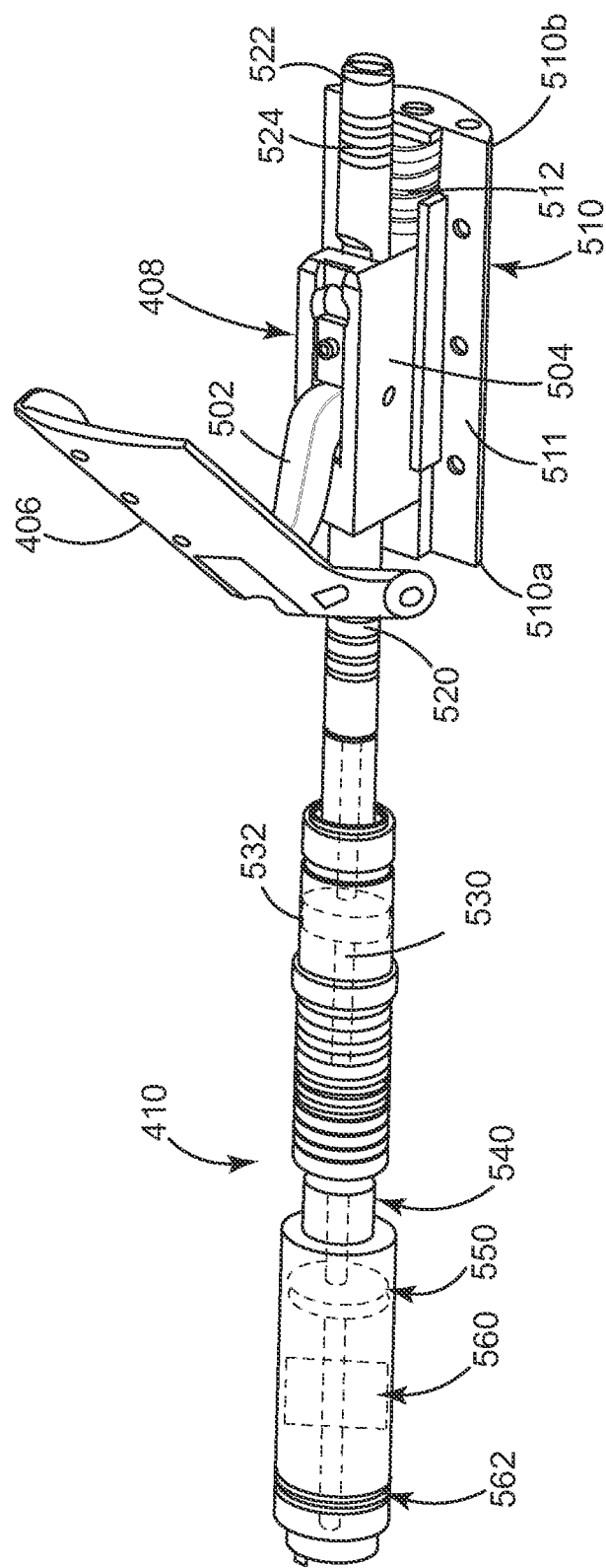
FIG. 5 depicts a linking mechanism and the actuating mechanism of the down-hole tool.

As discussed now with regard to FIG. 4, a down-hole tool 400 includes a housing 402 that may have a cylindrical shape. Housing 402 is shaped so that it fits inside a casing that lines a well. Housing 402 may accommodate a sensor 404 (e.g., seismic sensor, temperature sensor, pressure sensor, etc.), an anchoring arm 406 and a linking mechanism 408. Linking mechanism 408 may be connected to an actuating mechanism 410 that provides the energy for moving anchoring arm 406 between a closed position and an open position. If housing 402 and sensor 404 are removed, the positioning of the linking and actuating mechanisms 408 and 410 are illustrated in FIG. 5.

Linking mechanism 408 includes an arm 502 connecting anchoring arm 406 to spring block 510, which is also part of the linking mechanism. Arm 502 is connected to a central part 504 that belongs to spring block 510. Central part 504 is configured to move back and forth along a longitudinal axis X of tool 400. Because anchoring arm 406 has at least one point rotatably attached to housing 402 and also one point attached to arm 502, a movement of central part 504 results in a movement of arm 502 which also results in a movement of anchoring arm 406 between the closed and opened positions. Central part 504 is configured to mate with spring block housing 511 so that central part 504 moves only along longitudinal axis X. One or more spring mechanisms or springs 512 are located inside spring block 510 and in contact with central part 504 and configured to bias central part 504 toward one end of spring block 510. In FIG. 5, springs 512 are configured to bias central part 504 toward end 510a of spring block 510 so that anchoring arm 406 can open under the pressure exerted by springs 512 (assuming that actuating mechanism 410 exerts no force on central part 504). Spring block housing 511 together with springs 512 and central part 504 form an independent unit, the spring block 510, that may be easily removed from tool 400 and reversed so that springs 512 bias the anchoring arm to close.

Central part 504 is connected to first and second translation links 520 and 522, which may be opposite to each other relative to central part 504. Translation links 520 and 522 may also be part of spring block 510. One of the translation links is connected to actuating mechanism 410 while the other one is free. Each one may have one or more seals for sealing an inside of the housing 402 from the environment. Because the pressure outside the tool may be very high, e.g., around 1800 bars, it is undesirable to have this large pressure acting on one single side of the linking mechanism as the actuating mechanism will then have to overcome this large force. Thus, two translation links 520 and 522 are provided between the environment and the inside of housing 402 so that the external pressure acting on both translation links cancel each other and the actuating mechanism does not need to expend energy for overcoming the high external pressure.

One of the first and second translation links is connected to a screw shaft 530 that is configured to rotate within a ball nut translation mechanism 532. Ball nut translation mechanism 532 and screw shaft 530 are part of actuating mechanism 410. Screw shaft 530 is mechanically connected to a gear box 540, which is also part of the actuating mechanism 410. Actuating mechanism 410 further includes a clutch 550, a motor 560, and a braking mechanism 562.

Figure 6B:
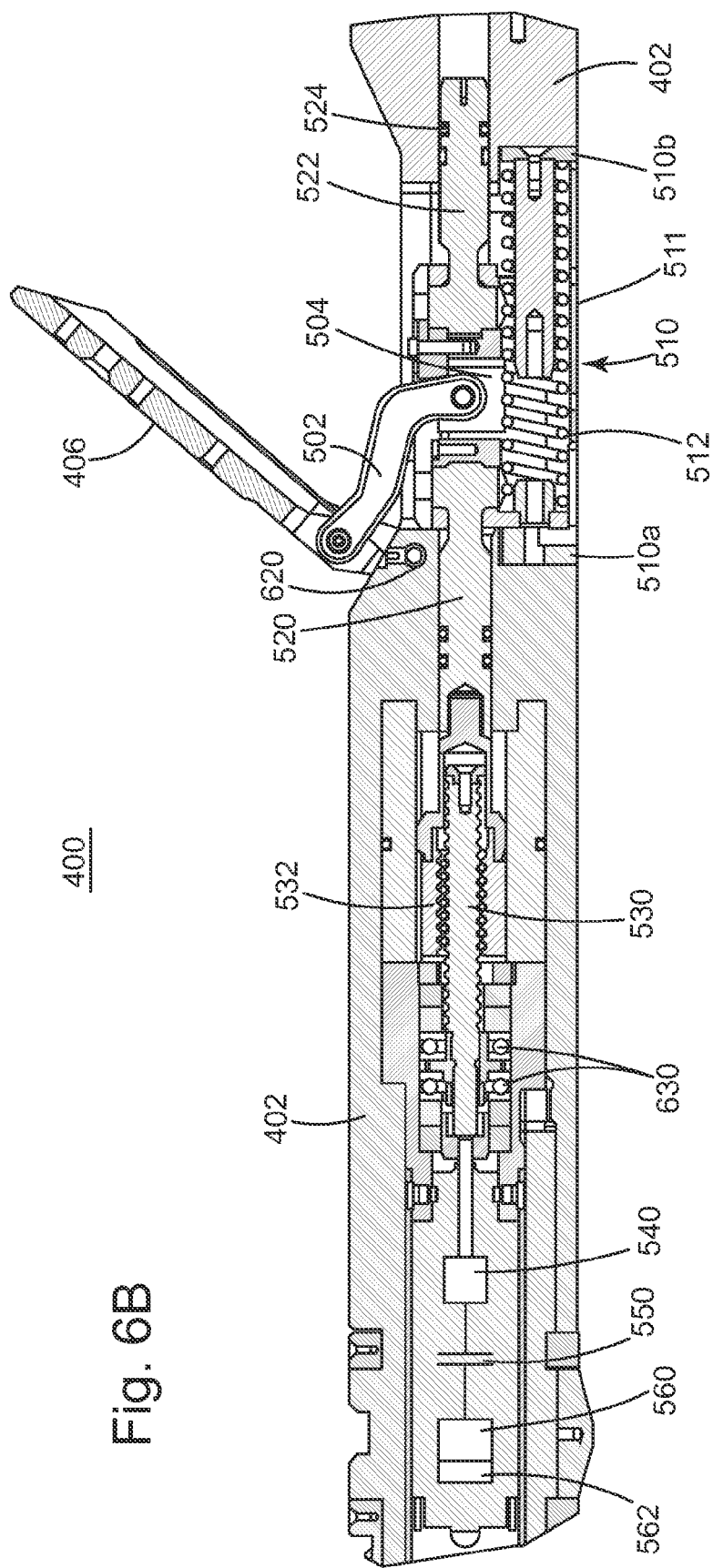

These components are now discussed with regard to FIGS. 6A and 6B, which show anchoring arm 406 closed and opened, respectively. FIG. 6A shows motor 560 connected to brake mechanism 562. Motor 560 may be any type of electrical motor. Brake mechanism 562 can be controlled, for example, from a controller (not shown) at the surface, with signals transmitted through cable 110, to block a rotational motion of the motor's axle. As will be discussed later, this is advantageous when the motor is switched off, i.e., there is no power supplied to the motor. Motor 560 connects to clutch 550, which is configured to engage or disengage motor 560's axle to gearbox 540. Gearbox 540 may be used to reduce or increase a rotation speed generated by motor's axle. Gearbox 540 is connected to screw shaft 530 and transmits the rotational motion of motor's axle to screw shaft. This rotational motion is transformed into translational motion by ball nut translation mechanism 532, which is configured to move back and forth along the longitudinal axis of the tool when screw shaft 530 rotates. The translational motion of ball nut translation mechanism 532 is transmitted to the first translation link 520 to close anchoring arm 406, as illustrated in FIG. 6A. This figure shows spring 512 being compressed and central part 504 being displaced away from motor 560.

On the contrary, FIG. 6B shows spring 512 biasing central part 504 so that anchoring arm 406 is open and ball nut translation mechanism 532 being displaced toward motor 560. Note that motor 560 may be replaced with a motor whose axle translates along the longitudinal axis instead of rotating, or with a magnetic mechanism capable of actuating translation link 520. Also note in FIG. 6B the second translational link 522 moving unitarily with central part 504. FIGS. 6A and 6B also illustrate the fixed point 620 of anchoring arm 406 attached to housing 402 and anchoring arm 406 being flush with an exterior surface of housing 402. However, anchoring arm 406 does not have to be flush with exterior surface of housing 402. FIGS. 6A and 6B also illustrate ball bearings 630 located around an end of screw shaft 530 for preventing the screw shaft to translate when actuated.

One advantage of the system illustrated in FIGS. 6A and 6B is that spring block 510 includes spring 512 and central part 504 as a compact and independent unit, to which translational links 520 and 522 and arm 502 may be easily attached, without a need to compress or decompress spring 512. Thus, the entire spring block 510 may be removed, reversed and reattached to the tool so that the spring force makes anchoring arm 406 to close instead of opening, which is sometimes desired in the field as will be discussed later.

Figure 1:
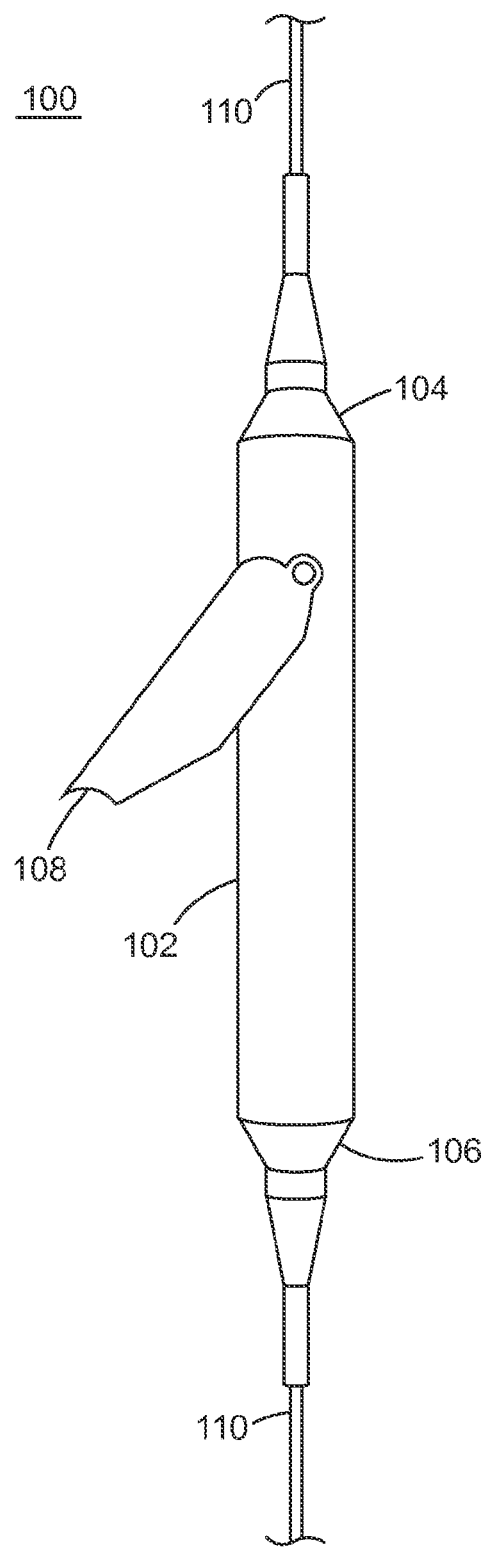
FIG. 1 depicts an exemplary down-hole tool.
Figure 2:
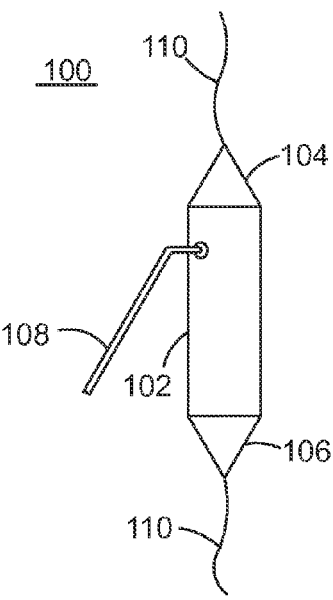
FIG. 2 depicts an exemplary diagram of a seismic tool.
Figure 3:
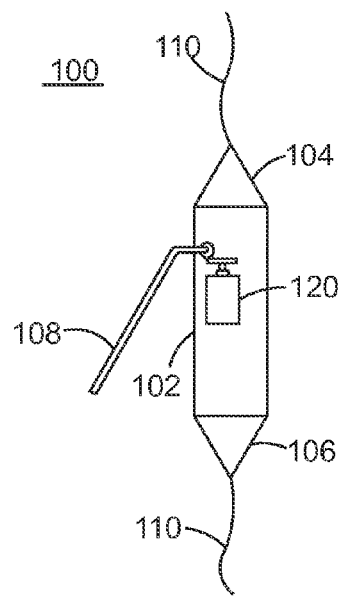
FIG. 3 depicts an exemplary diagram of an internal view of a seismic tool with a motor.
Figure 7A:
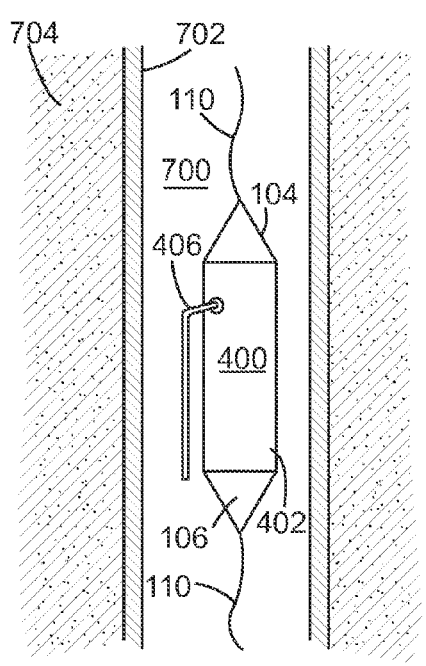
FIG. 7A shows the down-hole tool deployed in the well with the anchoring arm closed and FIG. 7B shows the same tool with the anchoring arm opened.
Figure 7B:
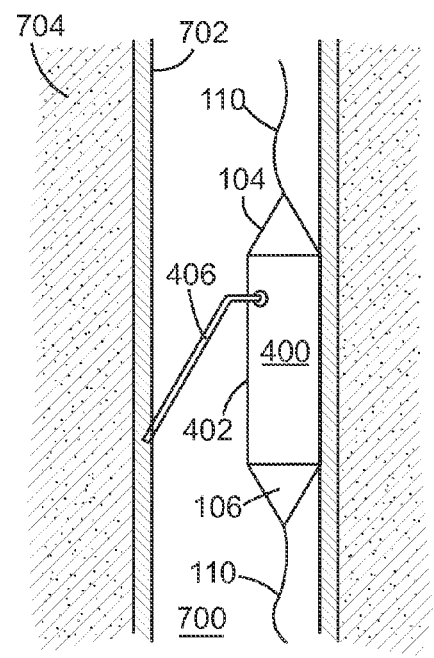

With the tool described above, an operation of deploying and removing the tool from a casing is now discussed. FIGS. 7A-B generically shows tool 400 being deployed inside well 700. Casing 702 was inserted inside well 700 and cemented in place, for example, with cement 704. FIG. 7A shows tool 400 having anchoring arm 406 in the closed position, i.e., substantially parallel to housing 402. Logging cable 110 is taut because of the weight of tool 400. FIG. 7A shows logging cable 110 extending past tool 400, which suggests that other tools are attached to tool 400. However, in one application, it is possible that a single tool is suspended from logging cable 110.

After it is determined that tool 400 is at the desired position (e.g., desired depth), motor 560, clutch 550 and gearbox 540 may be activated (as discussed next), for moving anchoring arm 406 from the closed position to the open position illustrated in FIG. 7B. In this way, a good coupling is established between tool 400 and the environment, in this case casing 702. Further, tool 400 becomes fixed relative to casing 702.

Figure 8:
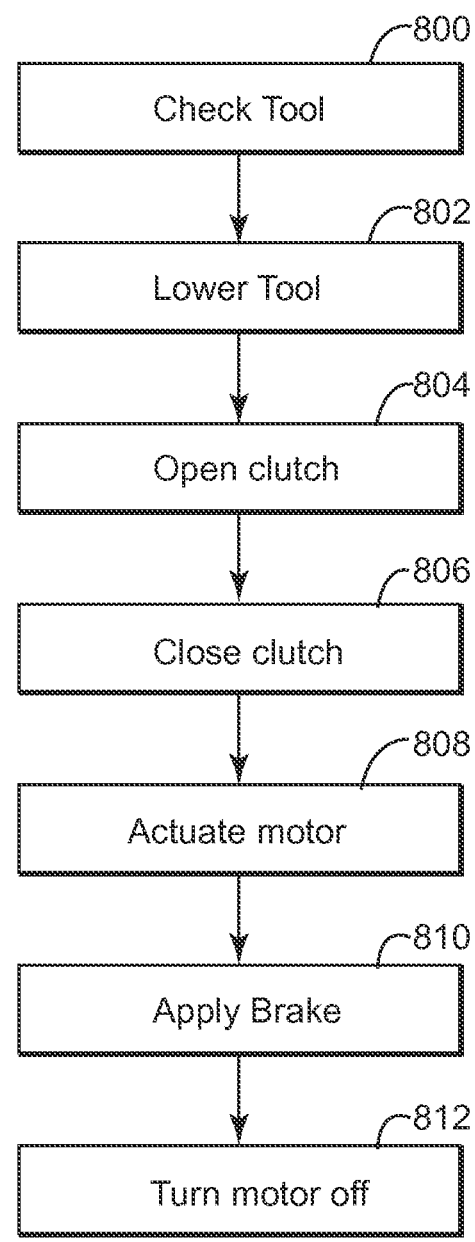
FIG. 8 is a flowchart of a method for deploying a tool in a well.

The process of opening and closing anchoring arm 406 is now discussed with regard to FIG. 8. In step 800, just before the tool 400 is inserted inside the well, its mechanisms may be checked. Note that this step is optional. In step 802, tool 400, having anchoring arm 406 in the closed position, is lowered inside the casing. When tool 400 arrives at its intended destination, a command (from a controller located on the ground that is in electric communication with the tool) is sent in step 804 to open the clutch. The process illustrated in FIG. 8 assumes that spring block 510 is positioned inside tool 400 to bias anchoring arm 406 to open. However, the friction within the motor and/or clutch and/or gearbox is higher than the spring force, and thus, the springs 512 cannot open anchoring arm 406. However, when the clutch is opened in step 804, the friction is reduced and the spring force moves anchoring arm 406 from the closed position to the open position, as illustrated in FIG. 7B. Thus, at this time, tool 400 is fixed relative to the casing. However, to strengthen this position and enhance the coupling with the environment, in step 806 the clutch is closed and in step 808 the motor is actuated (by another signal received from the controller) to further open anchoring arm 406. This is achieved by pushing central part 504 away from motor 560. Thus, extra force is applied on anchoring arm. However, it is not desirable to keep the motor on for long time periods. Thus, prior to switching the motor off, and to ensure that the extra force applied to the anchoring arm is not lost, brake 562 is turned on in step 810 to "freeze" the motor, i.e., to prevent the axle of the motor to rotate in an opposition direction that will allow central part 504 to move away from motor 560. Brake 562 consumes less power than the motor and is configured to work for long periods of time.

At this time, motor 560 is turned off in step 812 and tool 400 is fixed in place, with a larger force than the traditional tools. Also, motor 560 is turned off, relieving the stress that is usually present when the motor is on. Further, the tool is safe from falling inside the well in case of power failure as spring 512 biases continuously anchoring arm 406 toward casing 702.

Figure 9:
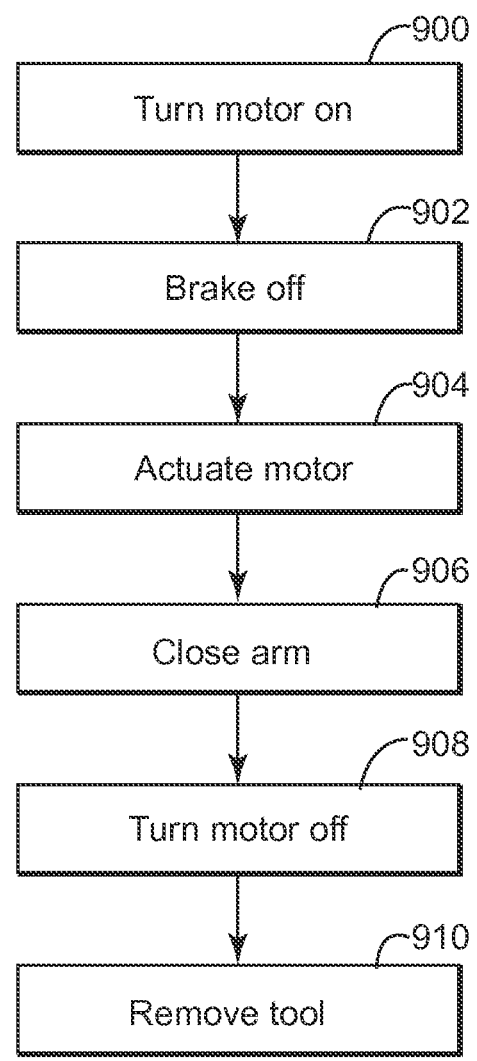
FIG. 9 is a flowchart of a method for retrieving a tool from the well.

When the time comes to remove the tool from the well, the following operations, as illustrated in FIG. 9, may be followed. Assuming that the clutch is closed, in step 900, the motor is turned on, i.e., power is supplied to the motor and in step 902 the brake is turned off. In step 904 the motor is actuated to return central part 504 to its original position, i.e., the position that closes anchoring arm 406. The closing of the anchoring arm is achieved in step 906. Then, in step 908, it is possible to turn the motor off and the friction produced by the motor, clutch and gearbox may be enough to overcome the spring force developed by spring 512. If that is not the case, the motor is left on. Alternatively, the brake may be turned on and the motor off to maintained the spring 512 in a compressed position, i.e., with the anchoring arm closed. Then, in step 910, the tool is raised and removed from the well.

However, if the spring block 510 is reversed, one or more of the steps discussed above for lowering and raising the tool into and out of the well also changes as now discussed. Prior to discussing the process of inserting and removing the tool from the well, the spring block 510 is shown in more detail in FIG. 10A for a better understanding of the easiness of changing its orientation. Note that when in the field, it is time consuming to take apart the tool and change the way in which the spring biases the anchoring arm. With the spring block illustrated in FIG. 10A, this operation becomes quick and safe as the spring 512 does not have to be decompressed and then re-oriented as in the traditional tools.

Figure 10A:
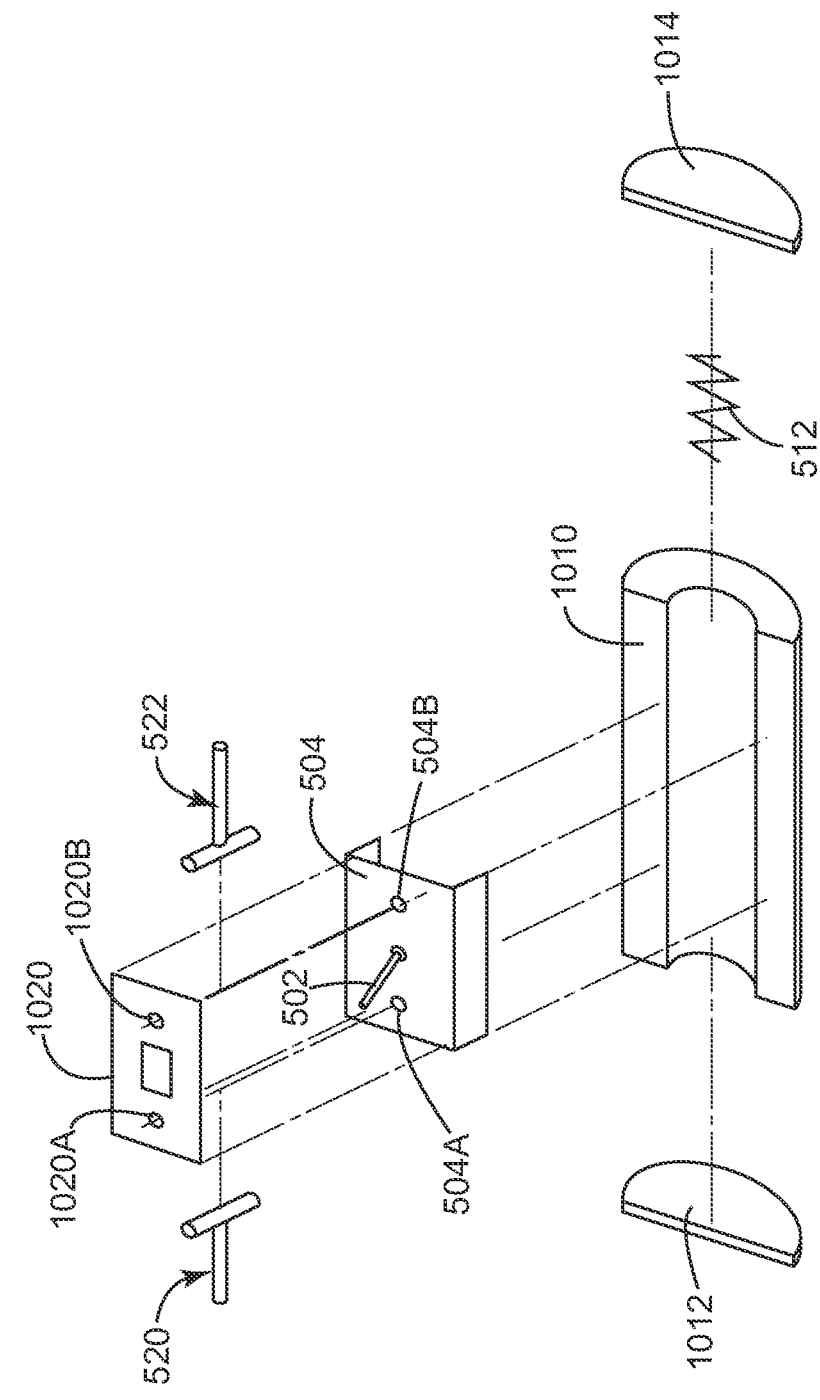
FIG. 10A is a detailed view of a spring block inside the tool and FIG. 10B is a view of the spring block part that is reversed when necessary.

FIG. 10A shows spring block 510 including a spring block housing 1010 that accommodates spring 512. Two end plates 1012 and 1024 are attached to the ends of spring block housing 1010 for keeping in place spring 512. Central part 504 is configured to be placed over spring block housing 1010 and spring 512 and the central part has two holes 504A and 504 for accommodating first and second translational links 520 and 522. A cap 1020 with corresponding holes 1020A and 1020B fits over central part 504 and maintains the ends of translational links 520 and 522 fixed relative to the central part. In one application, central part 504, by being in direct contact with spring 512, unitarily moves with spring 512 along the longitudinal axis of tool 400.

Figure 10B:
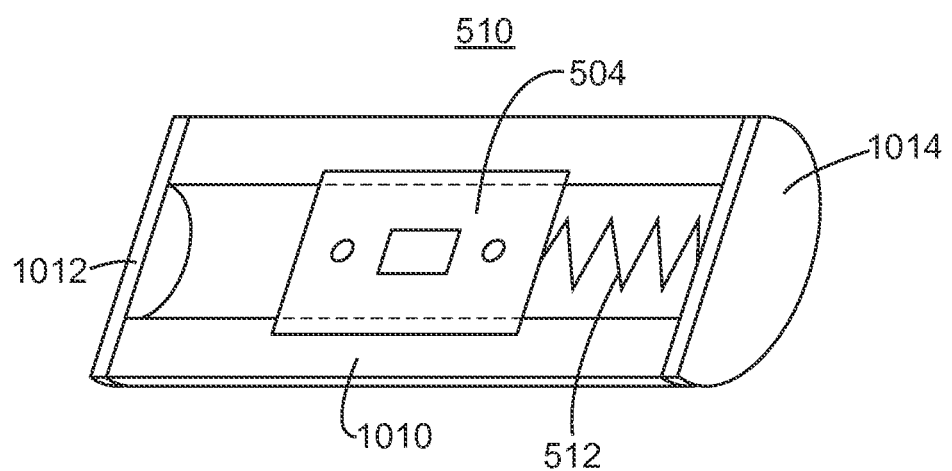

With this configuration, spring block 510 can be easily removed from the tool, reversed and reinstalled. This is due to the fact that the spring 512 does not have to be unwinded during the spring block removal. In this regard, FIG. 10B shows part of the spring block 510 and how the spring 512 is contained inside it, which makes the removal of spring block 510 easy and quick. Another advantage provided by one or more of these embodiments is the easy maintenance of the translating seals. As it is quite common to have to change the seals on high pressure and high temperature tools, this operation takes a considerable amount of time and generally needs the motor's removal and all the movement transformation parts, i.e., clutch, gearbox, etc. The spring block and the fact that the translation links can be unscrewed quickly without the need of removing the motor or another movement transformation parts allow a quick seal's replacement.

In other words, according to an embodiment there is a method for changing a biasing force for a down-hole tool for use inside a well. The method includes a step of removing an anchoring arm that is rotatably attached to a housing of the tool; a step of detaching a cap from a central part of a spring block; and a step of reversing an orientation of the spring block. A movement of the central part results in the movement of the anchoring arm between open and closed positions.

Figure 11:
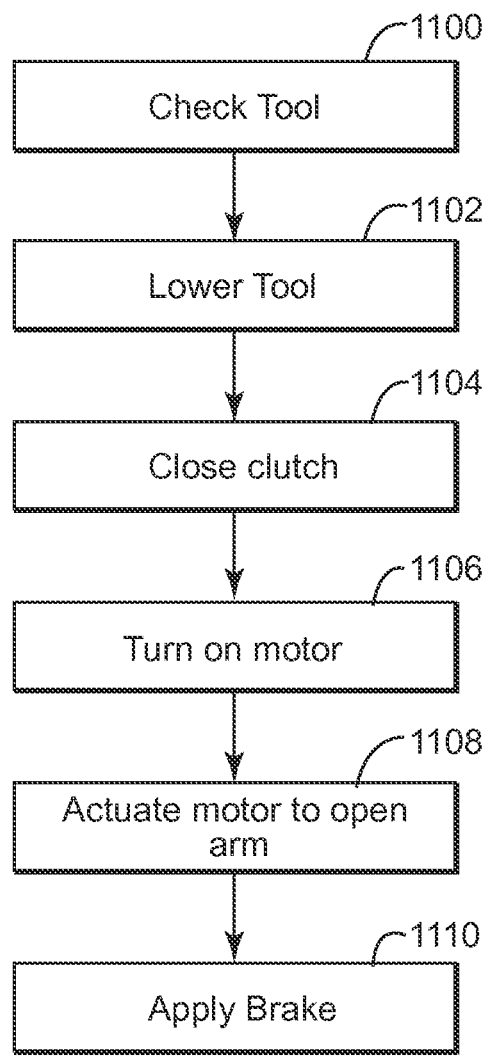
FIG. 11 is a flowchart of a method for deploying a tool in the well.

Considering that the spring block has been reversed and the spring now biases anchoring arm to be in the closed position, a process for lowering the tool inside the casing is now discussed with regard to FIG. 11. In step 1100, the tool and its components may optionally be checked. For example, the controller may send various signals for verifying the brake, motor and clutch. In step 1102, the tool is lowered into the casing and in step 1104 the clutch is closed to engage the motor with one of the translational links. In step 1106 the motor is turned on and in step 1108, after the tool has arrived at its intended destination, the motor is actuated to open the arm. Note that the motor works now against the spring, which biases the arm to be closed. When enough force has been applied to the arm, the brake is applied in step 1110 and then, the motor may optionally be turned off.

Figure 12:
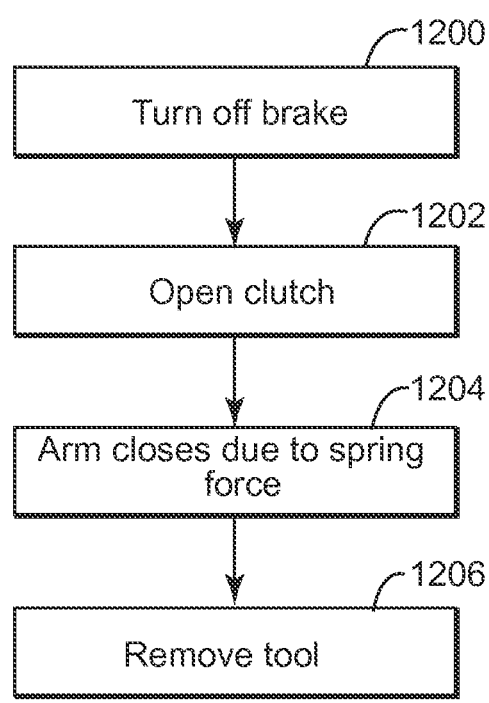
FIG. 12 is a flowchart of a method for retrieving a tool from the well.

When the time to remove the tool from the well comes, as illustrated in FIG. 12, the brake is turned off in step 1200 and the clutch is opened in step 1202, which makes the arm to close in step 1204 due to the spring force, which this time is pulling the arm toward the tool. If the spring force is not enough to close the arm, the clutch may be closed and the motor actuated to bring the arm in the closed position. Then, in step 1206 the tool is removed from the well. Note that with this configuration in which the spring biases the anchoring arm toward the tool's housing it might be easier to remove the tool from the well in case of power failure, as the spring will automatically close the arm.

Figure 13:
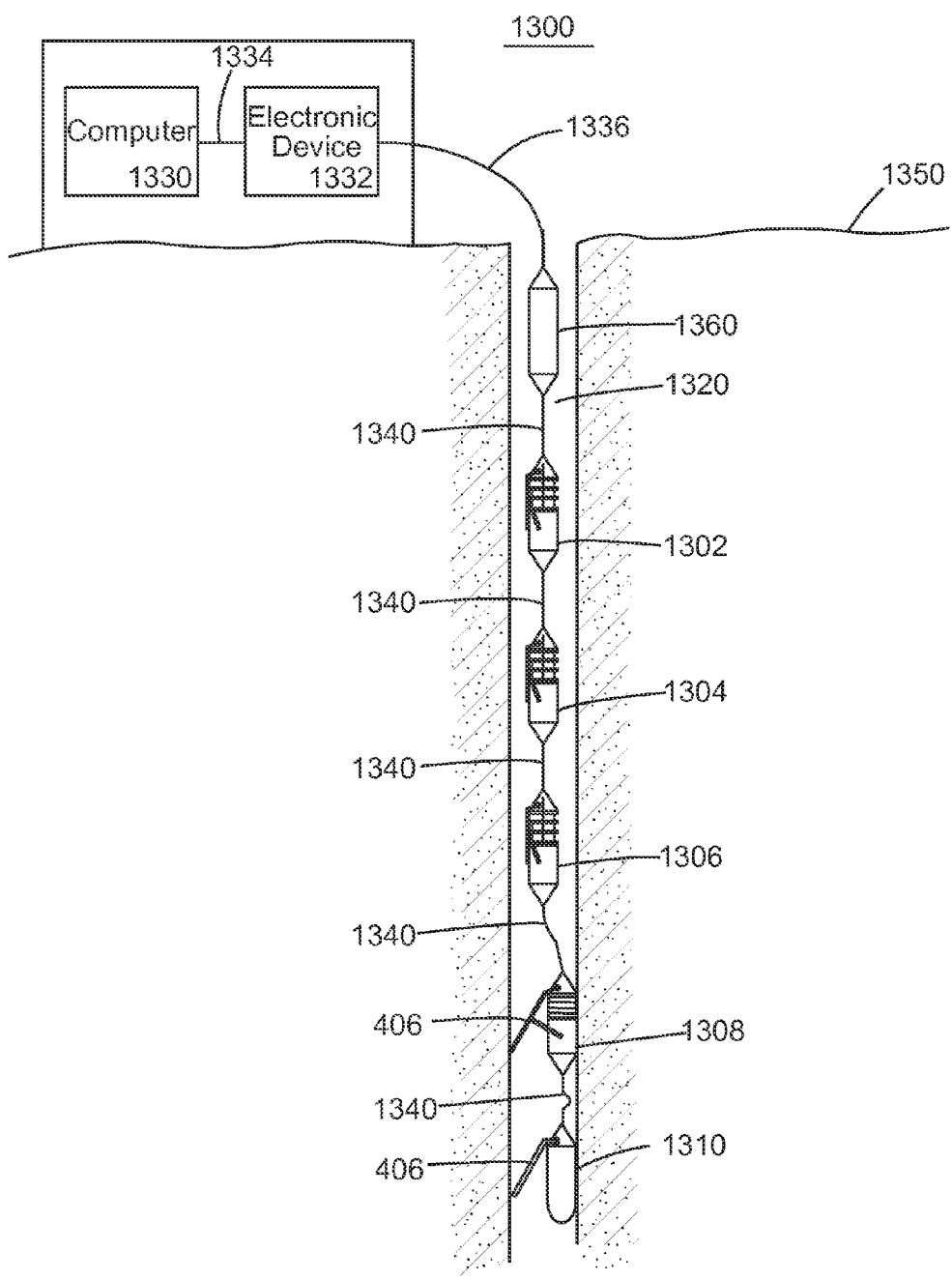
FIG. 13 depicts a system having plural tools that are deployed in a well.

FIG. 13 depicts a system 1300 having plural down-hole tools 1302 to 1310 deployed within a well 1320. Note that down-hole tools 1302 to 1310 are shown in the figure as different units to indicate that it is not necessary that all the tools are the same. After tools 1302 to 1310 have been deployed within the well 1320 and have reached their desired positions, anchoring arms of the tools may be opened to anchor the tools. For example, as depicted in FIG. 13, anchoring arms 406 of tools may be opened as discussed in the previous embodiments. Tools 1302 to 1310 are configured to receive command signals from computer 1330 along logging cables 1340. A controller 1332 may be linked through cable 1334 to computer 1330 and configured to coordinate the opening and closing of each arm of the tools. Controller 1332 and/or computer 1330 may also coordinate the motors, clutches, and breaks of each of the tools. In one application, any information send by the tools to the surface 1350 of the well may be received and stored in computer 1330 and/or controller 1332. Computer 1330 and controller 1332 may be integrated in a single unit, that may be portable (e.g., located on a truck or any other movable device). Connecting cable 1336 that connects controller 1332 to a telemetry device 1360 may have one or more strength members for being able to support the weight of all tools 1302 to 1310. Telemetry device 1360 may receive all the information from the tools (e.g., seismic data, temperature, pressure, information about the status of the tool, motor, clutch, anchoring arm, etc.) and partially process it so that the computer 1330 can read this information.

One or more advantages of the above-discussed embodiments are now discussed. Because of the novel design of the spring box, it is now easy to change the way in which the arm is biased, i.e., biased to open or close, depending on the application. Thus, if the tool chain is intended to be deployed inside the well for a long period of time for time lapse operation, the spring box may be configured to bias the arm in the closed position, thus not requiring any electrical energy for staying open. This feature is advantageous because the electrical energy is expensive and because, even if there is a power failure at the tool chain, the chain remains in position due to the mechanical bias and thus, it prevents the chain from collapsing inside the well or getting stuck inside the well.

If the chain is used in two successive operations, one requiring to bias the arm in the open position and the next operation requiring to bias the arm in the close position, reversing the orientation of the spring block is now easy and time efficient, because only the anchoring mechanism is disassembled and reversed, contrary to the existing devices for which the entire device has to be disassembled.

The disclosed embodiments provide an apparatus and method for a down-hole tool having a motor and a clutch and/or a reversible spring block. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A down-hole tool for use inside a well, the down-hole tool comprising:
   a housing;
   an anchoring arm rotatably attached to the housing and configured to move between an open position and a closed position;
   a spring block located inside the housing and having: (i) a central part, (ii) a spring block housing mating with the central part, and (iii) a spring mechanism contained inside the spring block, wherein the central part moves along a longitudinal axis (X) of the housing which results in the movement of the anchoring arm between the open or closed positions; and
   an actuating mechanism connected to the central part and configured to move the central part along the longitudinal axis relative to the spring block housing,
   wherein the spring block is detachably attached to the housing so that a first orientation of the spring block, relative to the housing, biases the anchoring arm to the closed position and a second orientation of the spring block, relative to the housing, biases the anchoring arm to the open position, and
   wherein the second orientation is achieved by detaching the entire spring block from the housing, reversing the first orientation of the spring block relative to the housing, and reattaching the spring block to the housing.

2. The tool of claim 1, wherein the spring block is configured to be removed from the tool without removing the actuating mechanism.

3. The tool of claim 1, wherein the spring block further comprises:
   first and second translation links attached at opposite ends of the central part.

4. The tool of claim 3, further comprising:
   a cap configured to be attached to the central part and to sandwich corresponding ends of the first and second translation links with the central part.

5. The tool of claim 3 wherein one of the first and second translation links is connected to the actuating mechanism while the other one of the first and second translation links is free.

6. The tool of claim 1, wherein the spring block housing and the spring stay together when the spring block's orientation is changed.

7. The tool of claim 1, wherein the actuating mechanism comprises:
   a motor; and
   a clutch located between the motor and the spring block.

8. The tool of claim 7, further comprising:
   a brake configured to brake the motor.

9. The tool of claim 8, further comprising:
   a gearbox located between the clutch and the spring block.

10. The tool of claim 9, further comprising:
    a screw shaft configured to transform a rotational motion of the motor into a translation of a first translation link of the spring block.

11. The tool of claim 1, further comprising:
    a sensor for measuring a parameter associated with the well.

12. A down-hole system for measuring a parameter associated with a well, the down-hole system comprising:
    a controller located at the surface of the well;
    at least one down-hole tool; and
    a connecting cable connecting the controller to the at least one down-hole tool,
    wherein the first down-hole tool includes,
    a housing,
    an anchoring arm rotatably attached to the housing and configured to move between an open position and a closed position,
    a spring block located inside the housing and having: (i) a central part, (ii) a spring block housing mating with the central part, and (iii) a spring mechanism contained inside the spring block, wherein the central part moves along a longitudinal axis (X) of the housing and a movement of the central part results in the movement of the anchoring arm between the open or closed positions, and
    an actuating mechanism connected to the central part and configured to move the central part along the longitudinal axis relative to the spring block housing,
    wherein the spring block is detachably attached to the housing so that a first orientation of the spring block, relative to the housing, biases the anchoring arm to the closed position and a second orientation of the spring block, relative to the housing, biases the anchoring arm to the open position, and
    wherein the second orientation is achieved by detaching the entire spring block from the housing, reversing the first orientation of the spring block relative to the housing, and reattaching the spring block to the housing.

13. The down-hole system of claim 12, wherein the spring block is configured to be removed from the tool without removing the actuating mechanism.

14. The down-hole system of claim 12, wherein the spring block comprises:
    first and second translation links attached at opposite ends of the central part.

15. The down-hole system of claim 12, wherein the actuating mechanism comprises:
    a motor; and
    a clutch located between the motor and the spring block.

16. The down-hole system of claim 15, further comprising:
    a brake configured to brake the motor,
    a gearbox located between the clutch and the spring block, and
    a screw shaft configured to transform a rotational motion of the motor into a translation of a first translation link of the spring block.

17. A method for changing a biasing force for a down-hole tool for use inside a well, the method comprising:
    removing an anchoring arm that is rotatably attached to a housing of the tool;
    detaching a cap from a central part of a spring block; and
    reversing a first orientation of the spring block relative to the housing to achieve a second orientation,
    wherein a movement of the central part results in the movement of the anchoring arm between open and closed positions,
    wherein the spring block is contained inside the housing and has: (i) the central part, (ii) a spring block housing mating with the central part, and (iii) a spring mechanism contained inside the spring block, wherein the spring block is detachably attached to the housing so that the first orientation of the spring block, relative to the housing, biases the anchoring arm to the closed position and the second orientation of the spring block, relative to the housing, biases the anchoring arm to the open position, and wherein the second orientation is achieved by detaching the entire spring block from the housing, reversing the first orientation of the spring block relative to the housing, and reattaching the spring block to the housing.

\* \* \* \* \*